United States Patent [19]

Kalmanash et al.

[11] 4,442,451
[45] Apr. 10, 1984

[54] DIFFERENTIAL RANDOM COLOR SWITCH FOR BEAM PENETRATION CRT

[75] Inventors: Michael H. Kalmanash, Fairfield; Edward L. Young, West Haven, both of Conn.

[73] Assignee: United Technologies Corporation, Hartford, Conn.

[21] Appl. No.: 259,381

[22] Filed: May 1, 1981

[51] Int. Cl.³ .................... H04N 9/27; H01J 23/34
[52] U.S. Cl. .............................. 358/73; 315/31 TV; 315/382
[58] Field of Search ................ 358/72, 73; 315/10, 315/30, 31 R, 31 TV, 379, 382

[56] References Cited

U.S. PATENT DOCUMENTS

| | | | |
|---|---|---|---|
| 3,339,016 | 8/1967 | Merryman | 358/72 |
| 3,492,416 | 1/1970 | Weber | 358/73 |
| 3,697,880 | 10/1972 | Melchior | 358/72 |
| 3,863,097 | 1/1975 | Labudda | 315/375 |
| 3,887,838 | 6/1975 | Thurston | 315/376 |
| 3,914,617 | 10/1975 | Corbel | 358/73 |
| 4,092,566 | 5/1978 | Chambers | 315/375 |
| 4,104,564 | 8/1978 | Cohen | 358/73 |
| 4,151,444 | 4/1979 | Jenness | 358/73 |
| 4,160,996 | 7/1979 | Nigra | 358/73 |
| 4,203,055 | 5/1980 | Chambers | 358/73 |

*Primary Examiner*—Tommy P. Chin
*Attorney, Agent, or Firm*—Richard P. Lange

[57] ABSTRACT

A color switch for a beam penetration CRT can display a randomly selected color in a first color write period, and immediately after the first color write period the magnetizing current in the high voltage transformer is reset during a second write period in a complementary color. A high voltage power supply has an output voltage selected to provide a baseline color whose voltage level is intermediate the voltage range of the CRT anode. A pair of drivers are connected to either end of the primary winding of the high voltage transformer and generate a voltage differentially across the primary winding that drives the voltage level either upwardly or downwardly from the baseline level. Immediately after the first color write period, a second color write period is formed in a complementary color by transitioning a pair of input switches. This causes the color switch to change to the voltage level on the opposite side of the baseline voltage level so that the flux level in the core of the transformer is reset to a balanced DC condition.

5 Claims, 2 Drawing Figures

DIFFERENTIAL RANDOM COLOR SWITCH FOR BEAM PENETRATION CRT

CROSS REFERENCE TO RELATED APPLICATIONS

The subject matter of this patent application is related to that disclosed in U.S. patent application Ser. No. 259,342 filed May 1, 1981 by M. H. Kalmanash RANDOM COLOR SWITCH FOR BEAM PENETRATION CRT; to U.S. patent application Ser. No. 259,343 filed May 1, 1981 by M. H. Kalmanash for DUAL MODE COLOR SWITCH FOR BEAM PENETRATION CRT; to U.S. patent application Ser. No. 259,344 filed May 1, 1981 for IMPROVED SEQUENTIAL COLOR SWITCH FOR BEAM PENETRATION CRT; to U.S. patent application Ser. No. 259,383 filed May 1, 1981 by M. H. Kalmanash for STROKE DURING RETRACE COLOR SWITCH; to U.S. patent application Ser. No. 259,394 filed May 1, 1981 by M. H. Kalmanash for CONSTANT CURRENT BIAS COLOR SWITCH FOR A BEAM PENETRATION CRT; and to U.S. patent application Ser. No. 284,831 filed July 20, 1981 by M. H. Kalmanash for MODULAR HIGH SPEED COLOR SWITCH, all of which are assigned to the same assignee as the present case.

1. Technical Field

This invention relates to a switching high voltage power supply for a beam penetration-type CRT, and more particularly, to a simple, small, high voltage color switch capable of providing a first write period in a random color and a second write period in a complementary color, the latter which also acts as a reset period.

2. Background Art

A beam penetration-type color CRT (cathode-ray tube) is generally known and is a display device having a faceplate on which an image or alphanumeric characters can be written. One or more phosphor layers on the inner surface of the faceplate can be selected to emit almost any desired wavelength of visible light. If two layers of phosphor are deposited on the faceplate, it is possible to display more than two distinct colors by changing the depth of penetration of the electron beam into the phosphor layers. Because the electron beam emitted by the cathode in the neck of the CRT strikes the phosphor layers at a velocity influenced primarily by the voltage level on the accelerating anode, a change in the voltage level applied to the accelerating anode will correspondingly change the proportion of light emitted by the two phosphor layers. In other words, in a penetration CRT with two layers of different light emitting phosphor up to about four colors can be displayed to a viewer by changing the DC voltage level applied to the accelerating anode positioned near the front of the CRT.

A significant limitation encountered in the use of penetration-type CRT's is related to the length of the reset period between write periods. Because the DC voltage level on the accelerating anode must be changed during the reset period, the length of the reset period is primarily defined by the electrical capacitance associated with the anode. The anode has a relatively large physical size and, as such, inherently has a large capacitance resulting in a significant amount of electrical charge being stored thereon during a write period. Of course, any additional capacitors, particularly large capacitors which are often used in high voltage power supplies, also increase the capacitance in the high voltage circuit and add to the reset period. Because this electrical charge is increased, or decreased, to change the voltage level on the anode, the reset period separating two write periods is related to the charge/discharge rate inherently associated with the total capacitance seen by the high voltage power supply.

Another limitation found in prior art color switches used with beam penetration CRT's is related to the sequencing of the colors to be displayed on the CRT faceplate. Although it is possible to display between three or four distinguishable colors on a two-layer penetration CRT, some high voltage color switches must operate in a particular sequence. In other words, the high voltage color switch provides one preselected voltage level to the anode in successive write periods, that is, the anode voltage is changed from 10 KV to 14 KV, from 14 KV to 18 KV and finally from 18 KV back to 10 KV. During each of these sequential write periods, images or alphanumerics written by the electron beam are displayed only in that color corresponding to the voltage level impressed on the anode. If images or alphanumerics are to be displayed in one color, such as red, during a particular write period, then at the completion of that write period no additional red information can be displayed until the high voltage color switch sequences through its preselected voltage levels to the next write period at which red information can be displayed.

Of particular interest is U.S. Pat. No. 3,906,333 issued Sept. 16, 1975 to M. Kalmanash for LOW COST SWITCHING HIGH VOLTAGE SUPPLY, assigned to the same assignee as the present case, which describes a switching high voltage power supply for use with a beam penetration-type cathode-ray tube This power supply has the secondary of a high voltage step-up transformer in series with the accelerating anode of the cathode-ray tube. The primary of the transformer is connected to ground through a capacitor for developing a DC voltage level. This voltage across the capacitor is fed to the regulating input of the baseline DC high voltage power supply. The color switching power supply of the present invention is an improvement over that described in this patent.

Another patent of interest is U.S. Pat. No. 4,092,556 issued May 30, 1978 to D. Chambers et al for SWITCHED HIGH VOLTAGE POWER SUPPLY SYSTEM. This patent describes a high voltage power supply for the rapid switching of high voltage applied to the anode of a beam penetration color cathode-ray tube. The energy for making the rapid transition between voltage levels is stored in two inductors, one for upward transitions and the other for downward transitions. When it is desired to change the voltage applied to the cathode-ray tube, the appropriate one of the storage inductors is coupled through a control switch to the anode causing the voltage applied to the anode to change at a rapid rate. The voltage rises until the desired voltage level corresponding to a desired upward color is reached at which time the switch is turned off and the storage inductor recharged. A tracking high voltage supply maintains the anode at the predetermined voltage level once that level has been reached.

DISCLOSURE OF THE INVENTION

It is an object of the present invention to provide a color switch for a beam penetration CRT in which a first write period in a random color is immediately followed by a second write period in a complementary color, thereby resetting the flux level in the high voltage transformer.

A particular feature of the differential random color switch for a beam penetration CRT according to the present invention utilizes a pair of drivers, such as operational amplifiers which are connected to either side of the primary winding of the high voltage transformer. Each driver is powered from a low voltage power supply that has only a single polarity level, i.e., positive voltage level or negative voltage level, thereby allowing such a small, simple single polarity power supply to be used. The input to the drivers is connected through a pair of simple switches so that the baseline voltage level can be driven in either direction from its preselected high voltage DC level.

According to the present invention, a differential random color switch for a beam penetration CRT includes a high voltage power supply which has a preselected output voltage level that is presented through a high voltage transformer to the anode of a beam penetration CRT. The baseline voltage level would typically be set to provide an intermediate or baseline color on the CRT, e.g., 14 KV in a range of 10 KV to 18 KV. A pair of drivers connected to either end of the primary winding of the high voltage transformer generates a voltage differential across the winding that can drive the baseline color either upwardly or downwardly from its preselected baseline voltage level. Any color can be selected at random for a write period by merely driving the primary winding with a pulse in one direction, or the other, by the differential voltage from the pair of drivers. Subsequent to the write period in one color, a second write period in a complementary color is immediately formed by differentially driving the primary winding in the opposite direction with the same magnitude, but opposite polarity, pulse.

A particular feature of the random differential color switch according to the present invention is that a first write period of a random color is followed by a second write period of a complementary color that resets the transformer flux level. During the second color write period the primary winding of the transformer is presented with a current pulse having a magnitude and duration which is identical to that presented in the first period, but of an opposite polarity. This allows information to be written on the faceplate of the CRT both during the first color write period and also during a second color write period in the complementary color, thereby avoiding an unusable reset period.

The foregoing and other objects, features and advantages of the present invention will become more apparent from the following description of a preferred embodiment and accompanying drawing.

BEST MODE FOR CARRYING OUT THE INVENTION

Figure 1:
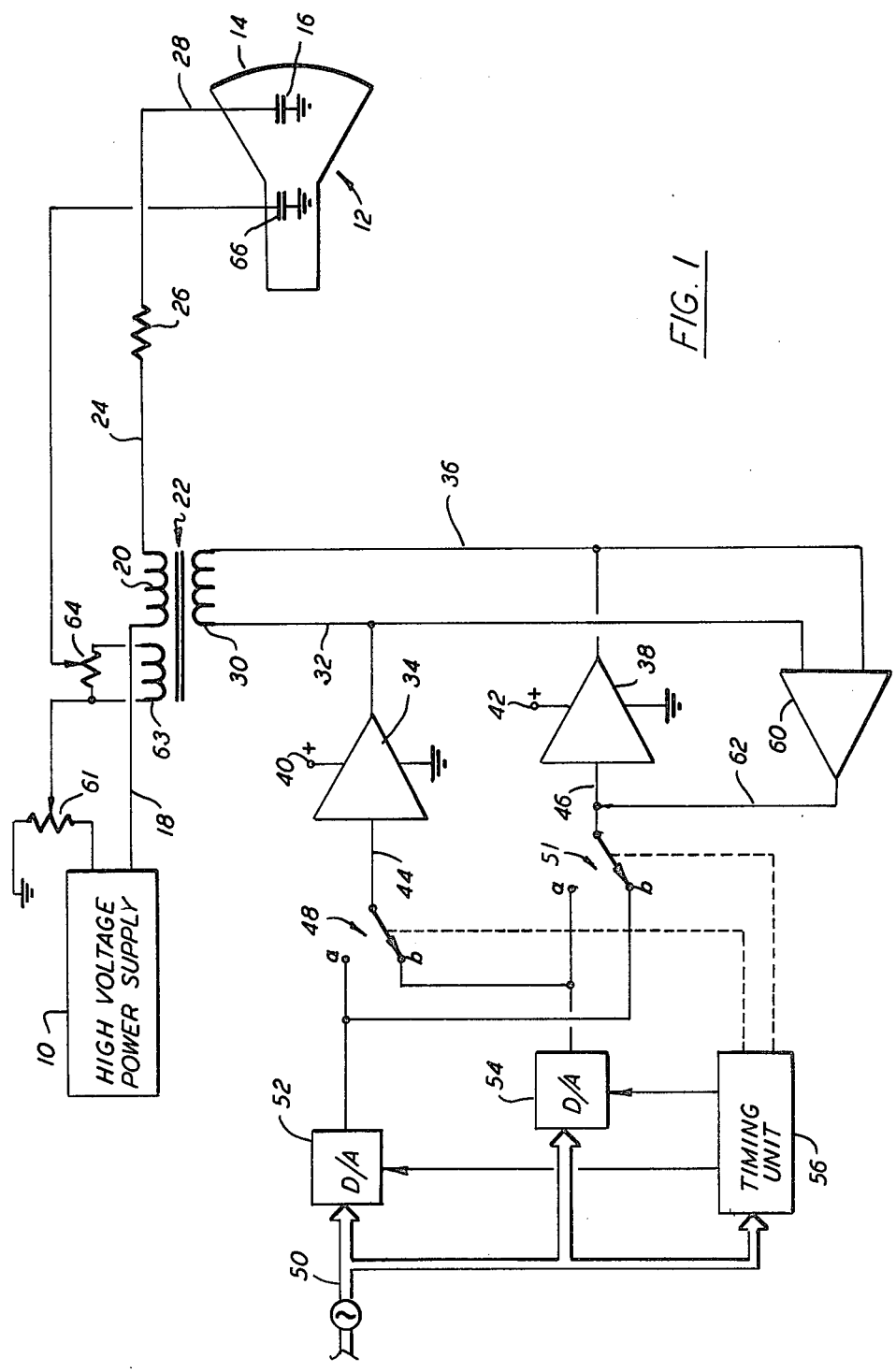
FIG. 1 is a schematic block diagram depicting one embodiment of a random differential color switch for a beam penetration CRT according to the present invention.

Referring first to FIG. 1, there is seen one embodiment of a differential random color switch for a beam penetration tube according to the present invention. In preferred form, a high voltage power supply 10 of a known type is provided and its DC output voltage level is selected to provide a predetermined baseline color (described in greater detail hereinafter) in a beam penetration CRT (cathode-ray tube) 12. The CRT includes a faceplate 14 on which images are written by a beam of electrons. The inner surface of the faceplate 14 typically has at least two layers of phosphor deposited thereon, each layer emitting a distinct wavelength, or color, or light in response to being excited by the electron beam. For the purposes of appreciating the present invention, it will be assumed that there is one layer of green phosphor and one layer of red phosphor located on the inner surface of the faceplate 14. Of course, more than two layers of phosphor could be deposited on the faceplate 14 in the event that more than about four distinct colors are to be displayed on the CRT 12. The beam of electrons is emitted by a cathode (not shown) located near the end of the neck portion of the CRT 12 and is accelerated toward the faceplate 14 under the influence of a high voltage applied to an anode 16. As is known, the anode 16 is formed from a material of high conductivity and is positioned circumferentially around the front portion of the tube to influence the beam of electrons. Because of its large size, the anode 16 has a relatively high capacitance, and, for the purposes of simplicity, is illustrated in the preferred embodiment of FIG. 1 as a capacitor.

In accordance with the present invention, the output of the high voltage power supply is presented along a line 18 to one end of a secondary winding 20 of a transformer 22. The other end of the secondary winding 20 is connected by a line 24 to one end of a damping resistor 26, the other end of which is connected by line 28 to the anode 16. As will be appreciated, the just described circuit is essentially a high voltage circuit operating in the range of, for example, 10 KV to 18 KV to provide voltage levels suitable for accelerating the beam of electrons toward the faceplate 14.

In the present invention that color in which information is displayed on the faceplate 14 is known as the "baseline color" and is obtained by impressing an intermediate voltage level, i.e., 14 KV, on the anode 16 from the high voltage power supply 10. The baseline color is used to display information on the CRT 12 most of the time. The secondary colors are those colors in which information can be written on the faceplate 14 for a write period whose length is defined by the characteristics primarily of the transformer 22. Complementary colors are those secondary colors which are on opposite sides of the baseline color and are obtained by impressing a voltage level of an opposite magnitude on the anode 16. For example, in the present embodiment where the baseline color is orange and obtained by impressing 14 KV on the anode 16, green and red are complementary colors in that they are obtained by impressing 18 KV and 10 KV, respectively, on the anode 16.

The transformer 22 also has a primary winding 30 and the turns ratio is selected to provide the needed voltage swing from the baseline voltage level in the known manner. For example, if a 1 to 160 turns ratio were employed in the transformer 22, a 25-volt voltage change across the primary winding 30 would cause a 4 KV change across the secondary winding 20. Because this voltage swing is tied to a baseline voltage level of approximately 14 KV, the resulting voltage swing on the line 24 could be as much as 4 KV in either direction.

In the present embodiment, one end of the primary winding 30 is connected by a line 32 to the output of a driver 34. In a similar manner, the other side of the priamry winding 30 is connected by a line 36 to the output of a driver 38. A particular feature of the present invention is that the drivers 34 and 38 can be powered by a low voltage power supply that has only a single polarity voltage output. In other words, the drivers 34 and 38, which in preferred form might be an operational amplifier or the like, are connected to terminals 40 and 42, respectively, to which a voltage level of, for example, +25 volts from a low voltage power supply (not shown) is provided. Such single polarity low voltage power supply is smaller, simpler and requires less regulation than a dual polarity, low voltage power supply.

The input to the drivers 34 and 38 are connected by lines 44 and 46, respectively, to the outputs of a pair of switches 48 and 51, respectively. The switches 48 and 50 would typically be of an electronic type which functionally are similar to mechanical single pole, double throw switch and thus for clarity in illustration, are shown in FIG. 1 in the well-known conventional mechanical form.

Incoming color information is presented to the differential random color switch according to the present invention in binary form from an external source (not shown) along a data line 50. A feature of the present invention is that a very simple input processing is required to demodulate the binary input signal. A pair of D/A converters 52 and 54 are provided and are connected to receive the binary input signal on the line 50. A timing unit 56 is also connected to the input line 50 to receive the color input signal. The output from the D/A 52 is connected both to one terminal of the switch 48 and one terminal of the switch 51. In a similar manner, the output from the D/A 54 is connected to both one terminal of the switch 51 and one terminal of the switch 48. This allows the timing unit 56 to switch the input to the respective drivers between the D/A 52 and the D/A 54 under the control of the timing unit 56.

One feature of the random differential color switch is that it includes a feedback loop to sense any hysteresis errors, timing errors, waveform errors or errors in the driver circuits themselves, etc. This feedback loop includes an integrating amplifier 60 which has its input terminals coupled to lines 32 and 36 to receive the signal waveforms applied to each end of the primary winding 30. The output from the amplifier 60 is connected by a line 62 to the input of the driver 38 to provide a DC signal which is the result of all the potential errors that may exist. In other words, the bias presented to the driver 38 is pulled up or down slightly to compensate for the errors inherent in the system.

One feature of the random differential color switch is that it senses the DC level of the waveforms presented to either end of the primary winding and then, through a feedback loop balances for any DC error. This feedback loop includes an operational amplifier 60 which has its input terminals coupled to lines 32 and 36 to receive the signal waveforms applied to each end of the primary winding 30. The output from the operational amplifier 60 is connected by a line 62 to the input of the driver 38 to change the bias.

A particular feature of the present invention is that it also provides dynamic tracking color focus voltage for the CRT 12. In preferred form this includes a first potentiometer 61 which is coupled to the output of the high voltage power supply 10. This is a separate output which has a lower DC level than the output used to supply the anode voltage. The first potentiometer 61 is connected through a winding 63 which is an additional winding on the transformer 22 to a second potentiometer 64. The potentiometer 64 is used to provide dynamic adjustment to the voltage applied to the focus electrode 66 which is located near the front portion of the electron gun (not shown). Typically, the focus voltage level applied to the focus electrode is a fixed percentage level of the voltage applied to the anode 16. A particular feature of the present invention is that this focus system requires a minimum of additional parts, only a couple of potentiometers and the additional winding on the transformer 22. The first potentiometer 61 adjusts the DC baseline voltage level while the second potentiometer 64 adjusts the dynamic output to the level applied to the focus electrode 66.

Figure 2:
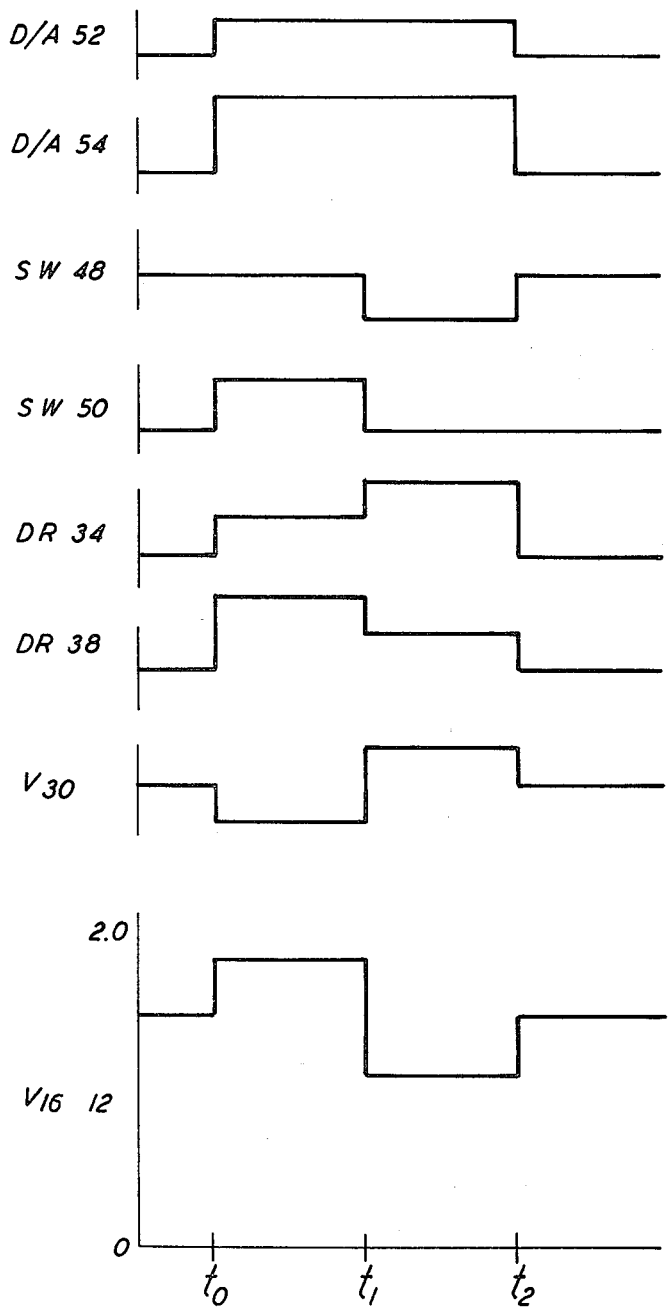
FIG. 2 is a diagram depicting waveforms at various points in the embodiment of FIG. 1.

Referring now to FIG. 2, the operation of the random differential color switch according to the present invention will now be described. As mentioned hereinbefore, a particular feature of the present invention is that a first write period can be selected in a random color, e.g., from time $t_0$ to time $t_1$ in which information can be written on the faceplate of the cathode-ray tube in the selected color. The first write period is immediately followed by a second write period time $t_1$ to time $t_2$, in a complementary color during which the flux level in the transformer 20 is reset. Both of these write periods can be used for displaying information on the faceplate 14 of the CRT by the appropriate deflection of the beam of electrons. This in essence eliminates the need for a reset period during which no color information is written.

Although this invention has been shown and described with respect to a preferred embodiment, it will be understood by those skilled in this art that various changes in form and detail thereof may be made without departing from the spirit and scope of the claimed invention.

We claim:

1. A high voltage color switch for a beam penetration cathode-ray tube in which a first color write period in a randomly selected color is immediately followed by a second color write period in a complementary color in response to an input waveform, comprising:

a high voltage power supply having an output selected to provide a baseline color when presented to the anode of said cathode-ray tube;

a high voltage transformer connected between the output of the anode of said high voltage power supply and said cathode-ray tube, said transformer including a primary winding for applying said input waveform to said anode of said CRT;

driver means including a pair of operational amplifiers, each having an input, and an output which are respectively connected to one side of said primary winding; and switch means presenting said input waveform to said inputs of said amplifiers in said first color write period and differentially presenting said input waveform to said inputs of said amplifiers in said second color write period.

2. A high voltage color switch according to claim 1, wherein said cathode-ray tube includes a focus electrode to which a focus voltage is applied to focus an electron beam, and wherein said high voltage color switch further includes a means connected to said focus electrode for providing said focus voltage that tracks said input waveform applied to said anode of said cathode-ray tube.

3. A high voltage color switch according to claim 2, wherein said means for providing a focus voltage includes a focus voltage winding on said transformer means connected between said high voltage power supply and said focus electrode of said CRT.

4. A high voltage color switch according to claim 3, wherein said means for providing a focus voltage includes a first potentiometer connected between said high voltage power supply and said focus winding of said transformer means for proportionally adjusting the voltage level from said high voltage power supply.

5. A high voltage color switch according to claim 4, wherein said means for adjusting the focus voltage further includes a second potentiometer coupled across the focus winding of said transformer means to proportionally adjust the voltage swing applied to said focus electrode.

* * * * *

UNITED STATES PATENT AND TRADEMARK OFFICE
CERTIFICATE OF CORRECTION

PATENT NO. : 4,442,451

DATED : April 10, 1984

INVENTOR(S) : Michael H. Kalmanash and Edward L. Young

It is certified that error appears in the above-identified patent and that said Letters Patent is hereby corrected as shown below:

Column 1, line 9: after "Kalmanash" insert --for--

Signed and Sealed this

Seventh Day of May 1985

[SEAL]

Attest:

DONALD J. QUIGG

Attesting Officer   Acting Commissioner of Patents and Trademarks